United States Patent

[11] 3,587,310

[72] Inventor Daniel N. Brown
San Diego, Calif.
[21] Appl. No. 872,267
[22] Filed Oct. 29, 1969
[45] Patented June 28, 1971
[73] Assignee The United States of America as
represented by the Secretary of the Navy.

[54] HOLLOW CORE INSTRUMENT CABLE
4 Claims, 3 Drawing Figs.
[52] U.S. Cl. .................................................. 73/170A,
138/127
[51] Int. Cl. .................................................. G01d 1/00
[50] Field of Search ........................................... 73/170 (O);
138/123, 127, 133

[56] References Cited
UNITED STATES PATENTS
3,211,823  10/1965  Brown et al. ................. 138/133X Primary Examiner—Jerry W. Myracle
Attorneys—R. S. Sciascia and Paul N. Critchlow ABSTRACT: A hollow core conduit is wound on a winch or storage reel aboard an oceanographic vessel and the conduit is of sufficient length to extend from the vessel to a submerged position preferably on the ocean floor where it is anchored. The fact that the conduit is formed with a hollow core permits an oceanographic instrument, such as a bathythermograph probe, to be run up and down the conduit when the conduit is disposed in a vertical disposition between the reel and the ocean floor. Temperature sensing thus can be achieved for all depths and the sensed data transmitted by a telemetering line which supports the probe to a recorder or other apparatus aboard the vessel. The conduit itself includes a flexible and porous exterior casing member formed of a braided ropelike material and a coil spring elastically engaging the interior wall of the casing member throughout its length to provide bulkhead strength sufficient to maintain the hollow core shape of the conduit over a desired range of conduit loads. The braided casing member is used to couple the ends of the conduit to the reel and the anchor so that the entire tensile load is borne by this casing with the interior spring relatively free to move.

PATENTED JUN 28 1971
3,587,310
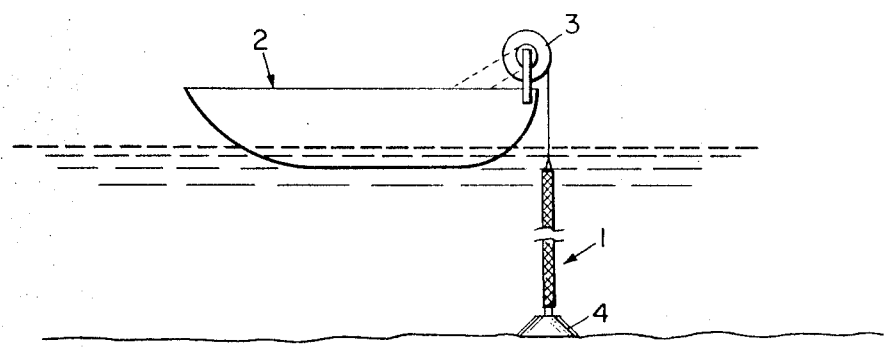
Fig. 1
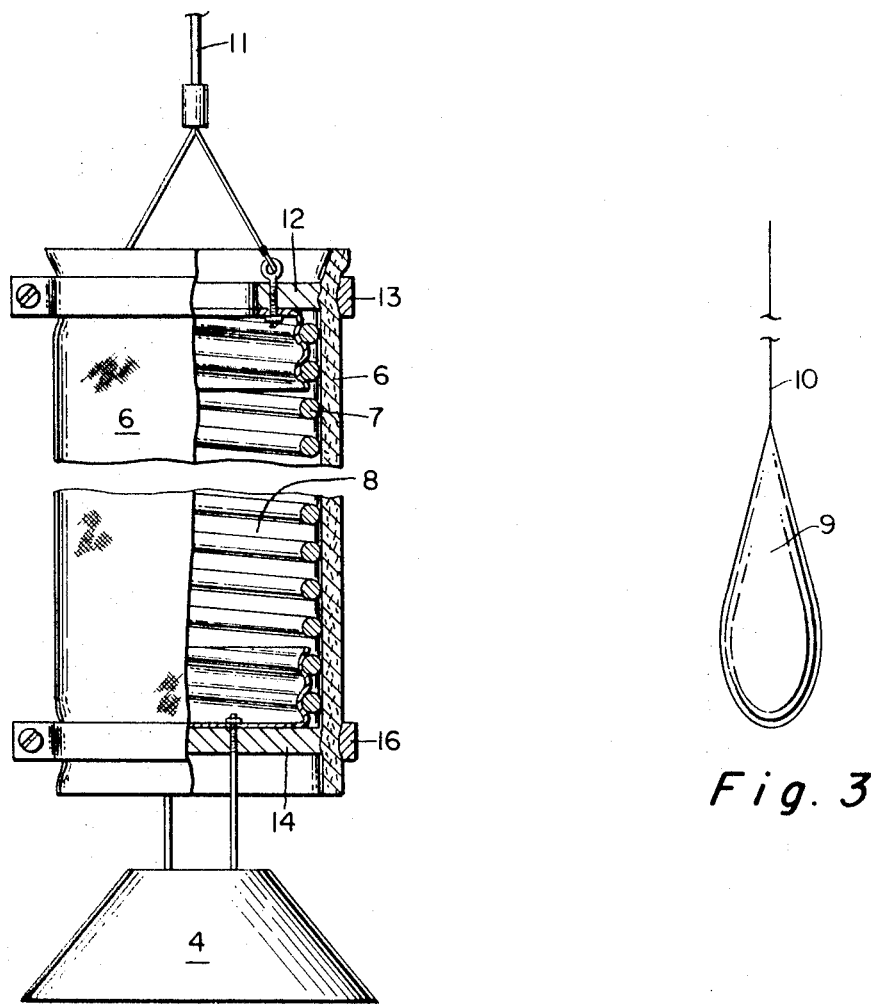
Fig. 2
Fig. 3
INVENTOR
DANIEL M. BROWN
ATTORNEY

HOLLOW CORE INSTRUMENT CABLE

The invention described herein may be manufactured and used by or for the Government of the United States of America for governmental purposes without the payment of any royalties thereon or therefor.

BACKGROUND OF THE INVENTION

The present invention relates to oceanographic apparatus and, in particular, to probelike apparatus capable of being moved through varying depths of the ocean to provide continuous readings as the depth is varied.

Oceanographic instruments, such as bathythermographs, are used to sense temperature at the varying depths of the ocean and to provide continuous sensing for all depths encountered, either a large number of bathythermographs must be employed in a chainlike configuration or a single bathythermograph can be run up and down a moored and anchored line to act as a probe. In either instance, it is important that the instruments be protected from attack by shark or other fish and, of course, it also is essential that the instrument be fully exposed to the ocean environment which it is sensing. Since exposure to the environment also results in exposure to fish attack, some difficulty has been experienced in providing reliable sensing means particularly when the sensing instruments must remain in the ocean environment for any length of time.

BRIEF SUMMARY OF THE INVENTION

The present invention solves these exposure problems by utilizing a hollow core cable characterized by the fact that it is porous so as to admit the ocean environment continuously along its length. Preferably, the cable has an exterior casing formed of a braided ropelike material and a coil spring elastically engages the interior wall of the ropelike casing to provide bulkhead strength adequate to maintain the hollow core shape over a desired range of conduit loads. The tensile load is borne entirely by the external casing attached at its upper end to a storage reel onto which the entire length can be wound. The lower end engages an anchor which permits the apparatus to be disposed vertically thus enabling a probelike instrument, such as a bathythermograph, to be run up and down the passageway provided by the hollow core.

A principal object of the present invention is to provide a simple and effective means for physically protecting a probelike oceanographic instrument while at the same time permitting continuous exposure of the instrument during its probing movements.

Another object is to provide such a means in the form of an elongate cable capable of being wound on a storage reel and also capable of being submerged into a vertically anchored disposition permitting the probelike sensor to be run up and down along its length.

Still another object is to provide such a means in combination with a probelike bathythermograph adapted to be run up and down a cable to sense temperature gradients at the varying depths.

BRIEF DESCRIPTION OF THE DRAWINGS

The invention is illustrated in the accompanying drawings of which FIG. 1 schematically depicts the present apparatus deployed from an oceanographic vessel;

FIG. 2 is a sectional view of a conduit portion of the apparatus showing details of the conduit construction and the manner in which the upper and lower ends of the conduit are coupled; and FIG. 3 schematically illustrates a particular type of probelike bathythermograph.

DETAILED DESCRIPTION OF THE INVENTION

Referring to the drawings, FIG. 1, as stated, simply illustrates the deployment of the present apparatus and, as there seen, the apparatus, which essentially is formed of an elongate conduit 1, is deployed from an oceanographic vessel 2 which mounts a storage reel or winch 3 on which the conduit is wound. An anchor 4 is coupled to the lower end of the conduit to maintain it in a vertical disposition when it is deployed for use.

As may be noted in FIG. 2, the physical structure of the conduit includes an external casing member 6 and an internal coil spring 7 elastically engaging the interior wall of casing 6 to provide bulkhead strength for this casing. Except for other fittings to be discussed these two elements, that is, the casing and the spring, together form the entire conduit which therefore is in the form of a hollow-core conduit provided with a central open passageway 8. In use, a probelike oceanographic instrument, such as the bathythermograph illustrated in FIG. 3, is adapted to be run up and down through passageway 8 to sense the ocean environment at the varying levels. Preferably a specially shaped bathythermograph, such as is shown in FIG. 3, is employed, this particular instrument being shaped in the manner of a fid having a reduced and tapered end 9 secured to a telemetering line 10 by means of which sensed data is transmitted to suitable recording data carried by the oceanographic vessel. The larger end of the fid-shaped bathythermograph is rounded in the manner shown to facilitate its movement through passageway 8.

One of the principal features of the invention lies in the manner in which the bathythermograph is physically protected while at the same time being fully exposed to the ocean environment. For these purposes, the conduit of the apparatus has a porous exterior casing 6 formed of a braided ropelike material such as hemp or other comparable material of sufficient strength to withstand anticipated loads. One advantage in using a rope type of casing is that there is relatively no twist when the casing is of the braid construction. The pitch and type of braid will be found to be strictly a design problem dependent primarily upon the tensile load to which the apparatus is subject during use. As will be noticed subsequently, the braided casing is the member which fully absorbs the tensile load.

Spring 7 disposed within the braided casing is an ordinary helical steel spring which again is selected according to the considerations imposed by use. The primary function of the spring is to maintain the shape of the hollow core or, in other words, to maintain the openness of passageway 8 to permit the sensing probe to be run up and down the conduit. Obviously, if the tensile load exceeds the strength of spring 7, the spring will collapse causing the entire conduit to assume a crushed attitude in which the passageway would be restricted or blocked. Consequently the primary design considerations will include pitch and type of braid of the outside rope and the pitch and dimensions of the spring core and these factors can be interwoven to achieve a desired tensile load capability or, in other words, to achieve a particular bulkhead strength for the conduit over a range of designed loads. At the same time, the braided construction of the casing should be sufficiently porous to admit the ocean environment along its entire length so that the probe can sense the temperature gradients in the ever increasing depth of the environment.

As already stated, the braided rope casing is used to absorb the entire load and, to achieve this result, the conduit is attached to haul and anchor lines by coupling only this causing member to these lines. However, the manner in which the ends are coupled can, of course, be provided in a number of different ways. In FIG. 3, for example, the upper end of the casing is coupled to haul line 11 by employing a doughnut-shaped, ferrulelike fitting 12 having its exterior surface formed to be threaded into the upper end of helical spring 7. Lines 11 are coupled directly to member 12. Casing 6 also is bound to member 12 by means of a clamp 13 which may be a metal clamp or simply a binding of any appropriate material. Since lines 11 are secured to member 12 and member 12, in turn, is clamped to braided casing 6, it will be seen that the tensile load at the upper end is borne by the casing. The same type of coupling is used to connect the lower end of the conduit to anchor 4. Here again, a preferably solid fitting 14 is threaded into the helical spring and clamped to braided casing 6 by another clamp 16.

Another significant advantage of the present construction is that it provides a simple and effective conduit for the bathythermograph probe while at the same time also providing flexible conduit which can be of sufficiently small diameter to be wound on storage reel 3. Obviously an apparatus of this type must be stored during periods of nonuse and the most convenient manner of storing is on a reel or winch from which the conduit readily can be deployed. Stiff, relatively inflexible conduits clearly would not permit this type of storage. The present braided casing and spring construction has been found to be a particularly adept manner of achieving the winch storage since it has the requisite flexiblity and at the same time the spring can be selected so as to prevent the conduit from crushing during winding or unwinding. However, as has been noted, the particular advantage of the present construction lies in its ability to provide a very simple and effective manner of protecting the probelike sensors, such as the bathythermograph shown in FIG. 3, while still permitting the bathythermograph to be fully exposed to the ocean environment at all levels.

Obviously many modifications and variations of the present invention are possible in the light of the above teachings. It is therefore to be understood that within the scope of the appended claims the invention may be practiced otherwise than as specifically described.

I claim:

1. Oceanographic apparatus for use in deploying a probelike sensor means between surfaced and submerged positions for deriving oceanographic data at the varying water levels, the apparatus comprising:
   a hollow-core conduit of sufficient length to extend from the surface to the submerged position;
   said conduit including;
      a flexible and porous exterior casing member formed of a braided ropelike material, and
      a coil spring elastically engaging the interior wall of the casing member throughout its length for providing bulkhead strength sufficient to maintain the hollow core shape of the conduit over a desired range of conduit loads;
   surface support means coupled to the upper end of the casing member; and
   anchor means coupled to the lower end of the casing member for maintaining the conduit in a substantially vertical submerged disposition in which the tensile load is borne by the flexible casing;
   the hollow core of said vertically disposed conduit providing a passageway through which said probelike sensor can be run upwardly and downwardly to obtain the oceanographic data from the water porously admitted into the conduit at the varying levels, said apparatus further including means for moving said sensor means upwardly and downwardly through said passageway.

2. The apparatus of claim 1 wherein said surface support means includes:
   a hoisting winch adapted to receive and store said conduit length;
   said bulkhead strength of said conduit being sufficient to maintain the hollow core shaped during winch winding and storing.

3. The apparatus of claim 1 wherein said braid of the ropelike material is sufficiently tight to minimize twisting motions of the conduit when in its substantially vertical submerged disposition.

4. The apparatus of claim 1 including in its combination the probelike sensor means, said means being a bathythermograph shaped as a fid and sized to be moved through the conduit core passageway; and
   said means for moving the sensor means includes a telemetering line secured at one end to the small tapered end of the bathythermograph and having its other end terminating at a surface location for enabling said oceanographic data to be detected at the surface.